United States Patent [19]

Ono

[11] Patent Number: 4,641,133
[45] Date of Patent: Feb. 3, 1987

[54] COMMUNICATION APPARATUS WHICH ALERTS OPERATOR TO PRESET AUTOMATIC OPERATION

[75] Inventor: Takeshi Ono, Yokohama, Japan

[73] Assignee: Canon Kabushiki Kaisha, Tokyo, Japan

[21] Appl. No.: 703,944

[22] Filed: Feb. 21, 1985

[30] Foreign Application Priority Data

Feb. 29, 1984 [JP] Japan .................................. 59-36300

[51] Int. Cl.⁴ ............................................ G08B 21/00
[52] U.S. Cl. ................................ 340/540; 340/309.15; 340/635; 340/653; 358/256; 358/257; 375/70
[58] Field of Search ........... 340/540, 653, 635, 309.15, 340/309.4, 825.65, 825.37, 870.09; 358/257, 256; 455/116, 117, 127, 70; 375/70

[56] References Cited

U.S. PATENT DOCUMENTS 3,609,241 9/1971 Riethmeier ........................ 358/256
3,962,534 6/1976 Ogawa .............................. 358/256

Primary Examiner—Glen R. Swann, III
Attorney, Agent, or Firm—Fitzpatrick, Cella, Harper & Scinto

[57] ABSTRACT

In a communication apparatus, if an operator manually operates the apparatus immediately before a designated time preset in the communication apparatus for automatic communication, an alarm is issued and the designated time communication is effected after the manual operation.

22 Claims, 4 Drawing Figures

COMMUNICATION APPARATUS WHICH ALERTS OPERATOR TO PRESET AUTOMATIC OPERATION

BACKGROUND OF THE INVENTION

1. Field of the Invention

The present invention relates to a communication apparatus, and more particularly to a communication apparatus which initiates a predetermined communication operation at a preset time.

2. Description of the Prior Art

As an apparatus of this type, a facsimile machine which automatically initiates image transmission at a time preset in a timer has been well known. In such a prior art apparatus, if an operator starts manual transmission, manual reception or copy operation immediately before the communication start time preset in the timer and continues the manual operation after the preset time, the manual operation dominates and the automatic transmission operation preset in the timer is cancelled or deferred. As a result, the intended communication may not be effected at the preset time.

SUMMARY OF THE INVENTION

It is an object of the present invention to provide a communication apparatus which effects time-designated communication without delay or cancellation.

It is another object of the present invention to provide an improved communication apparatus.

Other objects of the present invention will be apparent from the following description of the invention.

DETAILED DESCRIPTION OF THE PREFERRED EMBODIMENTS

In the following description, a facsimile machine is specifically discussed.

Figure 1:
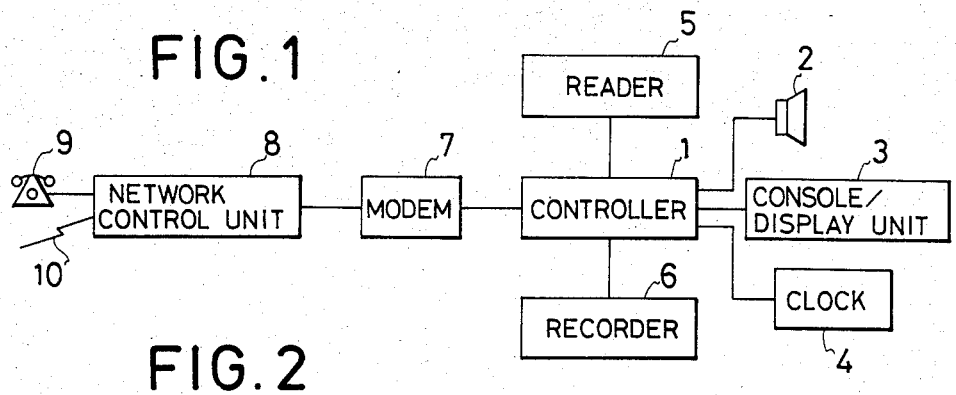
FIG. 1 is a block diagram of a facsimile machine in accordance with the present invention.

FIG. 1 is block diagram of a facsimile machine in accordance with the present invention.

Numeral 10 denotes a telephone line which is connected to a network control unit 8. The network control unit 8 switches the connection of the line 10 to a telephone set 9 or the facsimile machine and effects other line control operations such as loop retention.

A modem 7 for modulating and demodulating transmission reception signals in a predetermined scheme is connected to the network control unit 8. A control unit 1 comprising a microcomputer, a ROM and a RAM is connected to the modem 7 and data to be transmitted or received is processed by the control unit 1.

Image data read by a reader 5 which may comprise a CCD sensor is encoded by the control unit 1, modulated by the modem 7 and sent out to the line 10 through the network control unit 8. Image data received through the line 10 is demodulated by the modem 7, decoded by the control unit 1, and a recorder 6 which may be a thermal printer is controlled by the reproduced data to record the image.

A console/display unit 3 having a ten-key pad and other switches and display means such as an LCD is connected to the control unit 1. A time for the time-designated communication is inputted by the console/display unit 3 in a known manner. The time is inputted by the ten-key pad and it is monitored by the display. Then, the input time is set by activating a predetermined switch.

A clock 4 which may be a known clock IC is connected to the control unit 1. At the preset time, the control unit 1 moves to a predetermined communication control routine to initiate the designated communication operation.

An alarm unit 2 for generating an alarm sound is connected to the control unit 1.

In the present embodiment, if a copy operation or manual communication operation is performed during a predetermined time period prior to the designated time for initiating the designated communication, the control unit 1 causes the alarm unit 2 to generate the alarm sound or causes the console/display unit 3 to display the time-designated communication.

Figure 2:
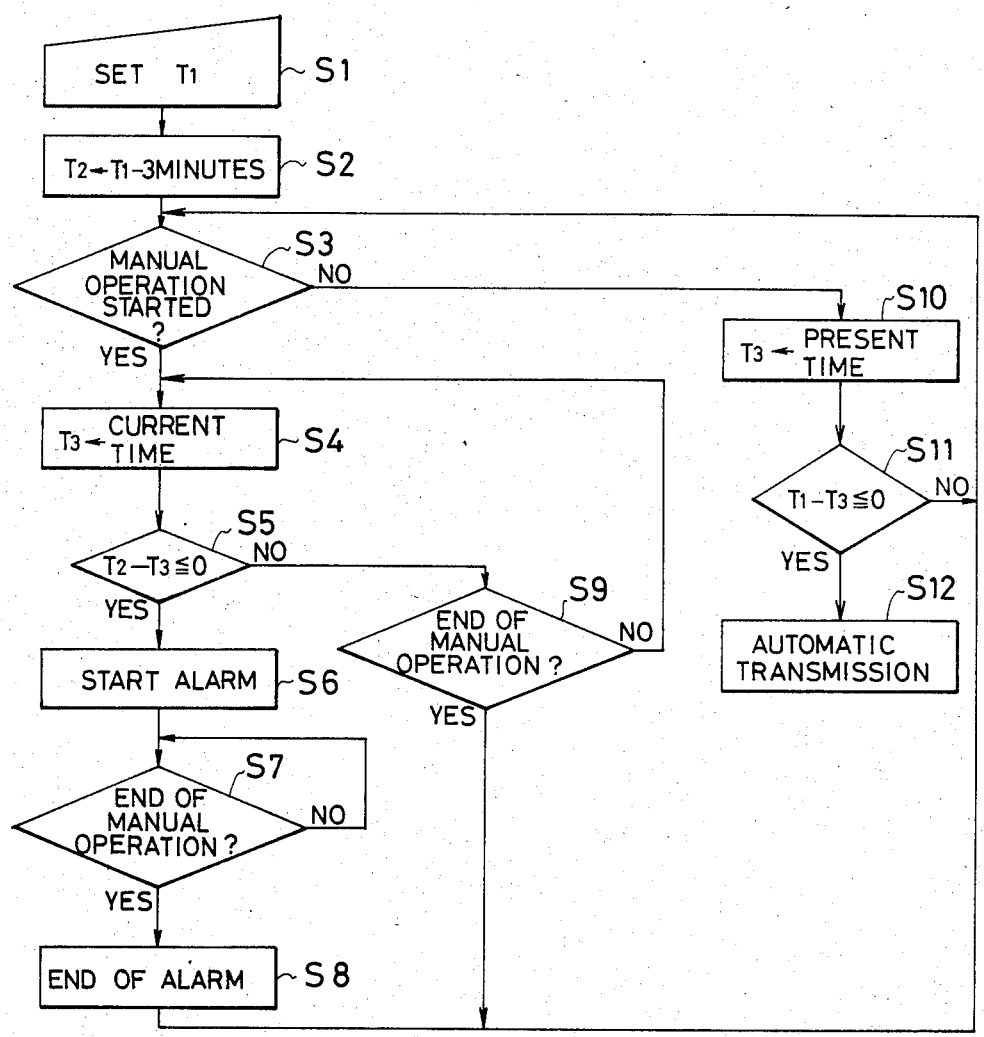
FIG. 2 is a flow chart showing a control procedure of a control unit 1.

Referring to a flow chart of FIG. 2, a control procedure of the control unit 1 is explained in detail.

In a step S1 of FIG. 2, an operator sets a desired communication start time $T_1$. The time $T_1$ is stored in a predetermined area of the RAM or a register. In a step S2, the control unit 1 subtracts three minutes from the communication start time $T_1$ to produce a time $T_2$. The time $T_2$ is also stored in a predetermined area of the RAM or a register. Any time period such as three minutes to be subtracted from the time $T_1$ may be set by the operator through the console/display unit 3.

In a step S3, whether a manual operation such as a copy operation or a manual transmission has been initiated or not is checked. It is checked by detecting the actuation of predetermined input means of the console/display unit 3. If the manual operation has been initiated, a control operation for the manual operation is started and the process proceeds to a step S4. If the manual operation has not been initiated, the process proceeds to a step S10.

In a step S4, a current time $T_3$ is read from the clock 4 and it is stored as $T_1$ and $T_2$ were done. In a step S5, $T_3$ is subtracted from $T_2$ and whether the difference is smaller than zero or not is checked. That is, whether the current time $T_3$ is equal to the time $T_2$ (three minutes before the communication start Time $T_1$) or past the time $T_2$ is checked. If the current time $T_3$ is equal to or past the time $T_2$, the process proceeds to a step S6, and if not, the process proceeds to a step S9. In the step S9, whether the manual operation has been terminated or not is checked, and if it has been terminated, the process returns to the step S3 and if not, the process returns to the step S4.

In the step S6, because three minutes are not left before the designated communication start time, the alarm unit 2 is activated to generate the alarm sound and the alarm is displayed on the display of the console/display unit 3.

In a step S7, the termination of the manual operation is monitored. If the termination of the manual operation is detected in the step S7, the alarm sound and the alarm display by the alarm unit 2 and the console/display unit 3 are terminated in a step S8 and the process returns to the step S3.

On the other hand, in the step S10, the current time $T_3$ is read from the clock 4 as was done in the step S4. In a step S11, the current time $T_3$ is subtracted from the communication start time $T_1$ and whether the difference is smaller then zero or not is checked. That is, whether the current time is equal to or past the communication start time or not is checked. If the decision is YES, the process proceeds to a step S12 to perform a predetermined communication operation, and if the decision is No, the process returns to the step S3.

Figure 3:
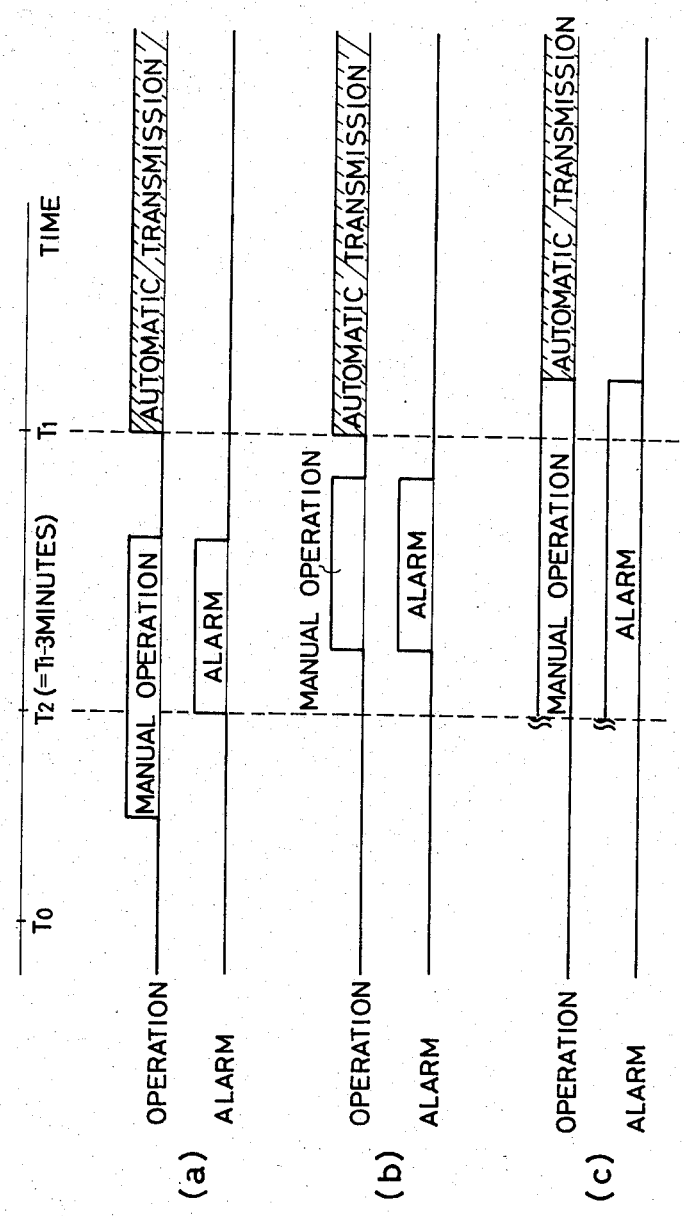
FIG. 3 is a timing chart showing an operation timing of the facsimile machine.

FIG. 3 illustrates the operation. It shows three timings for the operation of the apparatus and the display of alarm.

In FIG. 3(a), the manual operation such as copy operation is started more than three minutes before the communication start time $T_1$. Upon the initiation of the manual operation, the process jumps to the steps S3 and S4, then jumps to the steps S5 and S6 at the time $T_2$ to display the alarm. Since the manual operation terminates before the time $T_1$, the display of alarm is terminated after the jump to the steps S7 and S8. The process jumps to the steps S11 and S12 at the time $T_1$ to perform the predetermined communication operation.

In FIG. 3(b), the manual operation is started less than three minutes before the communication start time $T_1$. Thus, the process jumps to the steps S4, S5 and S6 so that the alarm is displayed at the start of the manual operation. The subsequent operation is identical to that in FIG. 3(a).

In FIG. 3(c), the manual operation does not terminate at the time $T_1$. Since the control is stopped in the step S7, the predetermined communication operation is delayed. When the manual operation terminates, the control is immediately shifted to the steps S3, S10 and S11, and the predetermined communication operation is started at the step S12.

In FIG. 3(c), the manual operation continues past the designated time. In order to inform the pass of the designated time to the operator, the display of alarm before the pass of the designated time and that after the pass of the designated time may be changed, as shown in a flow chart of FIG. 4.

Figure 4:
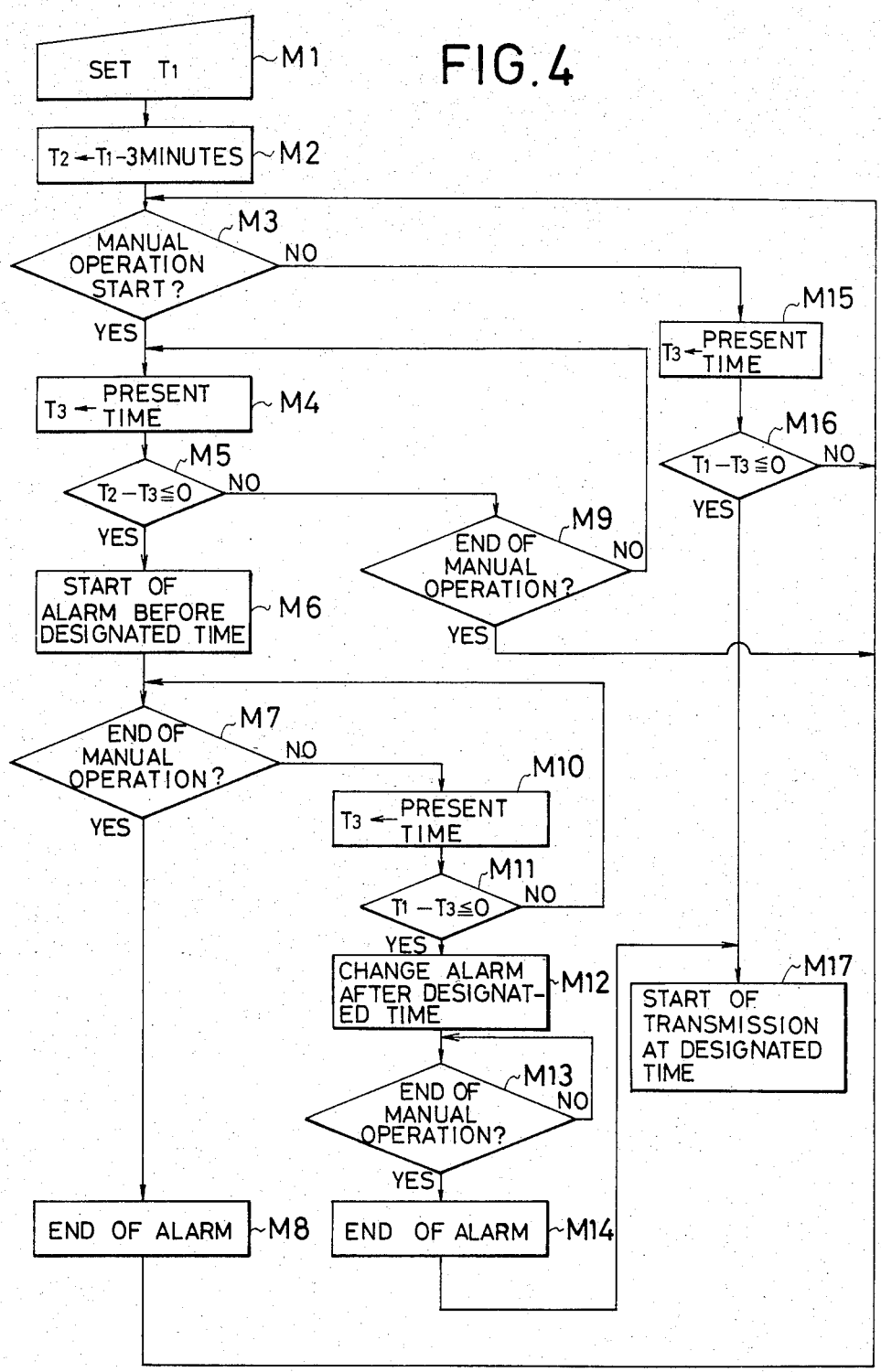
FIG. 4 is a flow chart showing an operation of the main control unit 1 when an alarm is changed at a designated time.

In a step M1 in FIG. 4, the operator sets a desired communication start time $T_1$. The time $T_1$ is stored in a predetermined area of the RAM or a register. In a step M2, the control unit 1 subtracts three minutes from the communication start time $T_1$ to obtain a time $T_2$. The time $T_2$ is also stored in a predetermined area of the RAM or a register.

In a step M3, whether a manual operation such as a copy operation or manual transmission has been initiated or not is checked. It is checked by detecting the actuation of predetermined input means of the console/display unit 3. If the manual operation has been initiated, the control for the manual operation is started and the process proceeds to a step M4. If the manual operation has not been initiated, the process proceeds to a step M15.

In the step M4, a current time $T_3$ is read from the clock 4 and it is stored as $T_1$ and $T_2$ were stored. In a step M5, the time $T_3$ is subtracted from the time $T_2$ and whether the difference is smaller than zero or not is checked. That is, whether the current time is equal to or past the time $T_2$ (three minutes before the communication start time $T_1$) or not. If the current time $T_3$ is equal to or past the time $T_2$, the process proceeds to a step M6, and if not, the process proceeds to a step M9. In the step M9, whether the manual operation has been terminated or not is checked. If it has been terminated, the process returns to the step M3, and if it has not been terminated, the process returns to the step M4.

In the step M6, since three minutes are not left before the designated communication start time, the alarm unit 2 is activated to generate the alarm sound and the alarm is displayed on the display of the console/display unit 3.

In a step M7, whether the manual operation has been terminated or not is checked, and if it has been terminated the process proceeds to a step M8, and if it has not been terminated, the process proceeds to a step M10.

In the step M8, the alarm sound and the alarm display by the alarm unit 2 and the console/display unit 3 are terminated and the process returns to the step M3.

On the other hand, in the step M10, the current time $T_3$ is read from the clock 4 as was done in the step M4. In a step M11, the current time $T_3$ is subtracted from the communication start time $T_1$, and whether the difference is smaller than zero or not is checked. That is, whether the current time $T_3$ is equal to or past the communication start time $T_1$ or not is checked. If the time $T_3$ is before the time $T_1$, the process returns to the step M7, and if the time $T_3$ is equal to or past the time $T_1$, the process proceeds to a step M12.

In the step M12, the alarm sound of the alarm unit 2 or the alarm display of the time-designated transmission on the console/display unit 3 is changed to inform the pass of the designated time to the operator. In a step M13, the termination of the manual operation is monitored.

If the termination of the manual operation is detected in the step M13, the alarm sound by the alarm unit 2 and the alarm display by the console/display unit 3 are terminated in a step M14 and the process returns to the step M3.

On the other hand, in the step M15, the current time $T_3$ is read from the clock 4 as was done in the step M4. In a step M16, the current time $T_3$ is subtracted from the communication start time $T_1$, and whether the difference is smaller than zero or not is checked. That is, whether the current time $T_3$ is equal to or past the communication start time $T_1$ or not is checked. If the decision is YES, the process proceeds to a step M17 to perform the predetermined communication operation, and if the decision is NO, the process returns to the step M3.

As described above, if the manual operation is effected during the three-minute period before the designated time $T_1$ for the time-designated communication, the alarm is issued by the alarm unit 2 and the console/display unit 3. Accordingly, the operator may interrupt the manual operation or take other appropriate action so that the intended communication is performed at the designated time. Since the time-designated communication is delayed only when the manual operation is not terminated, the possibility of delay of communication is minimum. The construction can be implemented by small modification of hardware and software and it is very simple and inexpensive.

In the above embodiment, the clock 4 is monitored by the control unit 1. Alternatively, times may be preset in the clock 4 and the control unit 1 may be interrupted at those times to effect the control. The alarm unit may be a combination of an oscillator and a speaker or a buzzer. The display of the console/display unit may be LCD, LED or CRT. The clock 4 may be a software clock in the control unit 1.

The time-designated communication may be either image transmission or image reception.

The alarm may be generated only when the manual operation is started before the designated time.

The present invention is applicable to not only the facsimile machine but also other communication apparatus which automatically communicates at a designated time such as a telex machine.

What is claimed is:

1. A communication apparatus comprising:
   time setting means for setting a designated time;
   automatic communication means for automatically communicating at said designated time;
   detection means for detecting a manual operation by an operator; and
   alarm means for issuing an alarm when said detection means detects a manual operation before said designated time while said automatic communication means is in an automatic communication mode.

2. A communication apparatus according to claim 1, wherein said alarm means issues the alarm responsive to detection of the manual operation by said detection means only if said detection means detects the manual operation within a predetermined time period immediately before said designated time.

3. A communication apparatus according to claim 2, wherein said predetermined time period is arbitrarily set by an operator.

4. A communication apparatus according to claim 1, wherein said alarm is an alarm sound.

5. A communication apparatus according to claim 1, wherein said alarm means comprises a display means and wherein said alarm is displayed on said display means.

6. A communication apparatus according to claim 1, wherein the automatic communication is started upon the termination of use of said communication apparatus after said designated time.

7. A communication apparatus according to claim 1, wherein the alarm is maintained during the use of said communication apparatus.

8. A communication apparatus according to claim 1, wherein said designated time is arbitrarily set by an operator.

9. A communication apparatus according to claim 1, wherein said alarm is issued only at the instant when the manual operation is detected.

10. A communication apparatus according to claim 1, wherein an alarm issued before the designated time is altered in character if said communication apparatus continues in use beyond the designated time.

11. A communication apparatus according to claim 1, wherein said communication apparatus is a facsimile machine.

12. A facsimile machine comprising;
    time setting means for setting a designated time;
    automatic communication means for automatically communicating at said designated time;
    detection means for detecting a manual operation by an operator; and
    alarm means for issuing an alarm when said detection means detects the manual operation within a predetermined time period immediately before said designated time.

13. A facsimile machine according to claim 12 wherein said automatic communication means starts the automatic communication upon the termination of the manual operation continued past said designated time.

14. A communication apparatus comprising:
    time setting means for setting a designated time;
    automatic communication means for automatically communicating at said designated time;
    detection means for detecting a manual operation by an operator; and
    alarm means for issuing an alarm when said detection means detects the manual operation within a predetermined time period before said designated time.

15. A communication apparatus according to claim 14, wherein said predetermined time period is arbitrarily set by an operator.

16. A communication apparatus according to claim 14, wherein said alarm is an alarm sound.

17. A communication apparatus according to claim 14, wherein said alarm means comprises display means and wherein said alarm is displayed on said display means.

18. A communication apparatus according to claim 14, wherein the automatic communication is started upon the termination of use of said communication apparatus after said designated time.

19. A communication apparatus according to claim 14, wherein the alarm is maintained during the use of said communication apparatus.

20. A communication apparatus according to claim 14, wherein said designated time is arbitrarily set by an operator.

21. A communication apparatus according to claim 14, wherein said alarm is issued only at the instant time when the manual operation is detected.

22. A communication apparatus according to claim 14, wherein an alarm issued before the designated time is altered in character if said communication means continues in use beyond the designated time.

* * * * *